United States Patent [19]

Elden

[11] Patent Number: 4,701,849

[45] Date of Patent: Oct. 20, 1987

[54] SYSTEM FOR SUMMONING SERVICE PERSONNEL AND MONITORING THEIR RESPONSE TIME

[76] Inventor: Michael G. Elden, 1405 Curlew Ave., Naples, Fla. 33962

[21] Appl. No.: 837,597

[22] Filed: Mar. 7, 1986

[51] Int. Cl.$^4$ .......................... G06F 3/04; G06F 15/24
[52] U.S. Cl. ...................................... 364/401; 364/406
[58] Field of Search .............................. 364/400–401, 364/405–406, 408, 200 MS File, 900 MS File; 235/7 R, 383; 186/35–36, 38–39, 41

[56] References Cited

U.S. PATENT DOCUMENTS

| | | |
|---|---|---|
| 1,796,668 | 3/1931 | Sarfaty . |
| 3,233,217 | 2/1966 | Bost, Jr. ................................ 340/33 |
| 3,304,416 | 2/1967 | Wolf ..................................... 235/92 |
| 3,310,797 | 3/1967 | Auger ................................... 340/286 |
| 3,821,707 | 6/1974 | Peters ............................. 340/171 R |
| 4,222,111 | 9/1980 | Sloan et al. .......................... 364/900 |
| 4,225,852 | 9/1980 | Waters et al. ................... 340/286 R |
| 4,392,119 | 7/1983 | Price et al. ....................... 364/401 X |
| 4,547,851 | 10/1985 | Kurland ............................... 364/401 |
| 4,553,222 | 11/1985 | Kurland et al. ..................... 364/900 |
| 4,569,421 | 2/1986 | Sandstedt ............................. 186/39 |
| 4,582,172 | 4/1986 | Takeuchi et al. ..................... 186/38 |

FOREIGN PATENT DOCUMENTS

WO82/02972 9/1982 PCT Int'l Appl. ................ 364/401

Primary Examiner—Gary V. Harkcom

[57] ABSTRACT

System for summoning service personnel to a particular table in a restaurant or similar facility and for monitoring service personnel response time. Each table includes a transmitter selectively activated by a switch at the table operated by a customer requiring service. When activated, each transmitter generates a signal unique to its table. A central station includes a display panel having a plurality of individual sections each relating to one of the tables. Each individual section includes a visual indicator, an audible annunciator, and a digital timer. The central station also includes a plurality of receivers, each responsive to one of the table transmitters. When a transmitter is activated by a customer, the corresponding receiver activates the appropriate visual indicator to alert service personnel that service is required at that table. Simultaneously the receiver causes the digital timer to count at one count per second. If the count reaches a predetermined amount, indicating the customer has waited too long, the audible annunciator is activated to alert service personnel of their failure to respond to the customer. When service personnel respond to the customer's signal at the table, the transmitter is de-activated, thus de-activating the visual indicator, audible annunciator, and timer. The number contained in the digital timer at that time represents the total response time to the customer's signal. A microprocessor connected to each visual indicator, audible annunciator, and time, stores the data generated for compiling a record of the performance of service personnel for each table.

4 Claims, 4 Drawing Figures

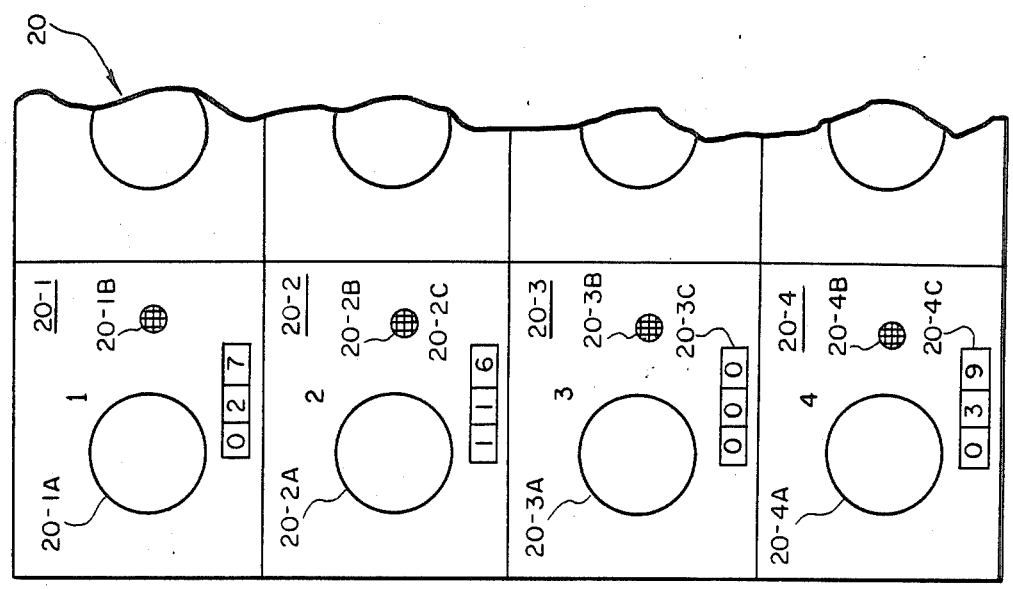
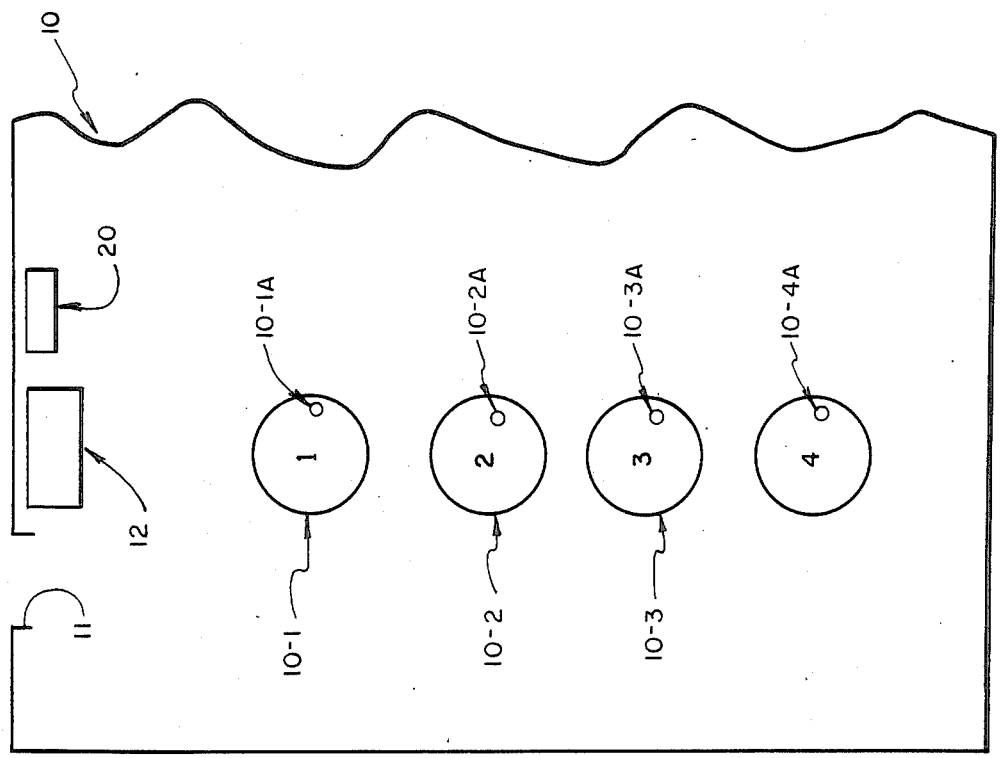

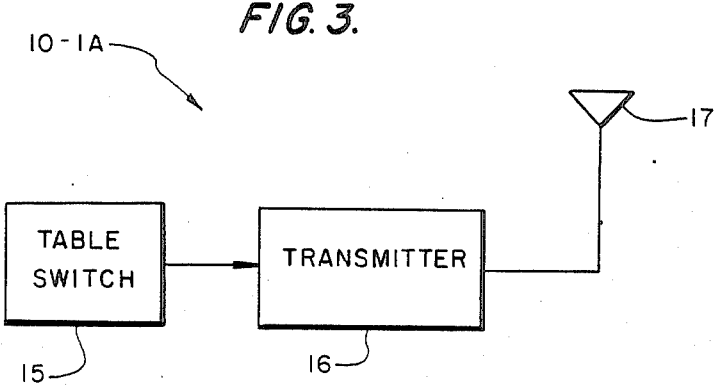
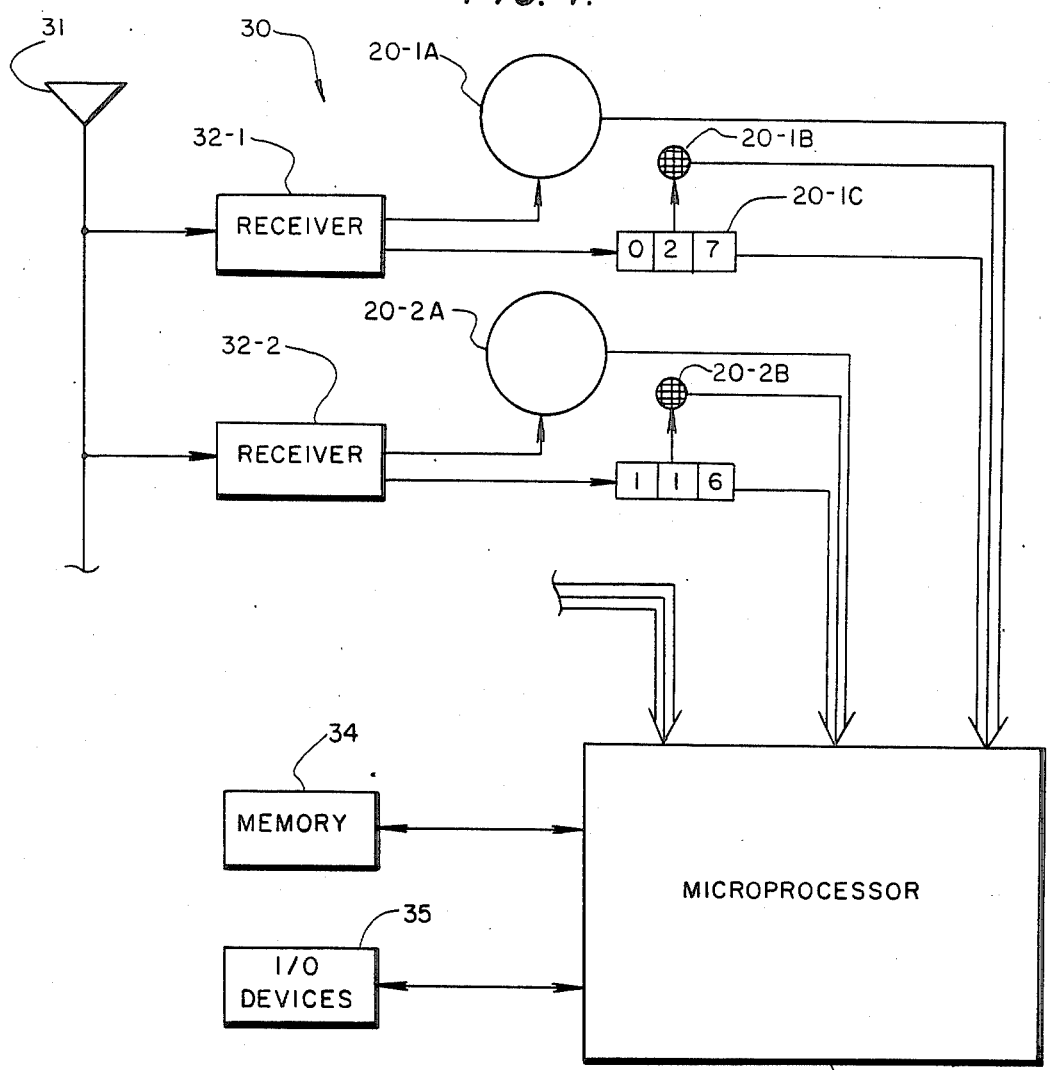

SYSTEM FOR SUMMONING SERVICE PERSONNEL AND MONITORING THEIR RESPONSE TIME

BACKGROUND OF THE INVENTION

1. Field Of The Invention

The present invention relates in general to signalling devices and in particular to a system for summoning service personnel to a particular location in a restaurant or similar facility and for monitoring their response time.

Many modern restaurants and similar facilities are designed to provide various unique and pleasant surroundings for their customers who dine or are otherwise attended to. Many times, such facilities are very large and have complex layouts of tables or booths. Also, various decorative dividers and other decorative objects may be placed throughout the facility to enhance the privacy and enjoyment of the customers. However, regardless of the amount and quality of the decorations and other advantageous features, it is essential for the continued success of the facility that the service personnel who attend to the various needs of the customers do so in a rapid and efficient fashion. Failure to so respond results in excessively long waiting periods for the customers, thereby causing dissatisfaction. Thus, there is a need for a system which provides a means for a customer in such a facility to summon service personnel when desired and further which provides a means for the facility to monitor and evaluate the performance of its service personnel in responding to its customers.

2. Description Of The Prior Art

U.S. Pat. No. 3,821,707 to Peters discloses a wireless waitress call system for a restaurant, cocktail lounge, or similar facility. A central transmitter is activated by the operation of any one of a plurality of switches, a switch being located at each one of a plurality of tables or booths at the facility. The operation of any one of the switches causes the transmitter to transmit a signal of a particular distinctive frequency corresponding to the individual table at which the switch was operated. A receiver is mounted on a tray carried by the waitress. The receiver responds to the signals transmitted by the transmitter. The receiver is coupled to a plurality of indicating lights mounted on the tray, each relating to a different table or booth. Selective means are included in the receiver circuit such that, when a particular switch at a particular table or booth is operated, a corresponding light on the tray of the waitress is energized so as to inform the waitress that service is desired at the designated table or booth.

U.S. Pat. No. 4,222,111 to Sloan et al. discloses a method and apparatus for monitoring the status of tables in a restaurant. A processor unit is coupled by means of a plurality of serial data busses to a host unit and also to a plurality of service units. The host unit includes a plurality of push buttons which correspond respectively to tables within a particular service area of the restaurant. The processor unit computes and stores the status of each table in the restaurant. The processor also periodically computes and transmits display information representative of the updated status of the tables to the host unit and to the service unit. The status of a particular table is updated by depressing a corresponding table button of either the host station or the respective service station. The processor unit computes the updated status information and stores the updated table status in a memory of the processor unit. Running totals for each table can be stored in the processor unit and may be displayed after each meal, day, week, or month.

Other similar systems are disclosed in U.S. Pat. Nos. 1,796,668 to Sarfaty, 3,233,217 to Bost, Jr., 3,304,416 to Wolf, 3,310,797 to Auger, and 4,225,852 to Waters et al.

SUMMARY OF THE INVENTION

The present invention relates to an improved system for summoning service personnel to a particular location in a restaurant or similar facility and for monitoring their response time. The facility includes a plurality of tables at which customers are located. Each table includes an individual transmitter which is selectively activated by means of a switch at the table. The switch is operated by a customer at the table when service is required. When activated, each transmitter generates a signal which is unique to its corresponding table. A central station is provided which includes a display panel having individual sections designated therein relating to each of the tables. Each individual section includes a visual indicator, an audible annunciator, and a digital timer. A plurality of receivers are provided within the central station. Each of the receivers corresponds to an individual one of the transmitters at the tables. When a table transmitter is activated by a customer desiring service, the corresponding receiver at the central station activates the visual indicator of the appropriate individual section to alert the service personnel that service is required at that table. At the same time, the receiver also resets the digital timer to zero and causes the timer to count upwardly at a rate of one count per second. If the count of the timer reaches a first predetermined amount, indicating that the customer has waited too long for response by the service personnel, the audible annunciator is then activated to alert the service personnel of the unsatisfactory response to the customer's signal. When the service personnel does responds to the customer's signal at the table, the table transmitter is de-activated, thus de-activating the visual indicator, the audible annunciator, and the digital timer. The number contained in the timer at that time represents the total response time of the service personnel to the customer's signal. A microprocessor is connected to each of the visual indicators, audible annunciators, and digital timers for storing the data generated thereby and for generating a historical record of the performance of the service personnel for each table in the facility.

It is an object of the present invention to provide an improved system for summoning service personnel to a particular location in a restaurant or similar facility and for monitoring their response time.

It is another object of the present invention to provide such a summoning system which is economical and reliable in construction and operation.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 1 is a top plan view schematically illustrating a portion of a restaurant or similar facility having a plurality of tables located therein at which customers may be located.

FIG. 2 is an elevational view schematically illustrating portion of a central station, including a plurality of individual sections relating to each of the tables illustrated in FIG. 1, adapted for use in the facility illustrated in FIG. 1.

FIG. 3 is a block diagram of a transmitter means adapted for use at each of the tables illustrated in FIG. 1.

FIG. 4 is a block diagram of a receiver means adapted for use with the central station illustrated in FIG. 2.

DETAILED DESCRIPTION OF THE PREFERRED EMBODIMENT

Referring now to FIG. 1, there is illustrated a portion of a restaurant, indicated generally at 10, or similar facility. The restaurant 10 includes a combined entrance/exit 11 near which a cashier's table 12 or other similar stand may be located. Within the restaurant 10, a plurality of tables 10-1, 10-2, 10-3, and 10-4 are located. Frequently, a restaurant identifies each of the tables therein by a number for simplicity, and the tables 10-1, 10-2, 10-3, and 10-4 are so designated as tables 1, 2, 3, and 4, respectively. Customers may be seated at each of the tables 10-1, 10-2, 10-3, and 10-4 to receive service from the service personnel of the restaurant 10. Although the present invention will be described and illustrated in the context of a restaurant 10 having only four tables, it will be appreciated that the present invention can be utilized in a facility 10 having virtually any number of tables or other locations therein at which service may be requested.

Each of the tables 10-1, 10-2, 10-3, and 10-4 is provided with an individual transmitter means, indicated generally at 10-1A, 10-2A, 10-3A, and 10-4A, respectively. The structure of one of the transmitter means 10-1A is illustrated in FIG. 3 and is representative of each of the other transmitter means 10-2A, 10-3A, and 10-4A. As shown in FIG. 3, the transmitter means 10-1A includes a table switch 15 connected to a transmitter 16 having an antenna 17. The table switch 15 can be any type of commonly available mechanical or electrical switch which is operable by a customer seated at the table 10-1 when service is desired. When the table switch 15 is so operated, the transmitter 16 is activated to generate and radiate an electromagnetic signal from the antenna 17. The transmitter 16 and antenna 17 are conventional in the art. The signal generated by the transmitter 16 is predetermined to be unique to the individual table 10-1 at which it is located. The signal can be made unique in any one of several known fashions. For example, the signals generated from the tables 10-1, 10-2, 10-3, and 10-4 can differ from one another in frequency. Alternatively, the signals may be digitized and arranged to include different identifying codes. Other similar types of unique signals may also be generated. All that is required is that each signal be capable of distinguishing the individual table from which it was generated from the other tables.

A central station, indicated generally at 20, is provided to receive the signals generated by the various transmitter means 10-1A, 10-2A, 10-3A, and 10-4A. As shown in FIG. 1, the central station 20 may be located near the cashier's table 12 or other location where the service personnel of the restaurant 10 can see it frequently and conveniently. FIG. 2 illustrates only that portion of the central station 20 which corresponds to the tables 10-1, 10-2, 10-3, and 10-4 illustrated in FIG. 1. For each of the tables 10-1, 10-2, 10-3, and 10-4, an individual section 20-1, 20-2, 20-3, and 20-4, respectively, is provided at the central station 20. As with the tables 10-1, 10-2, 10-3, and 10-4 described above, the individual sections 20-1, 20-2, 20-3, and 20-4 may be designated by the numbers 1, 2, 3, and 4, respectively, for simplicity. Each of the individual sections, such as the individual section 20-1, includes a visual indicator 20-1A, an audible annunciator 20-1B, and a digital timer 20-1C. As will be explained in greater detail below, the visual indicator 20-1A, the audible annunciator 20-1B, and the digital timer 20-1C are provided to alert the service personnel of the restaurant 10 that service is requested by one of the customers at a particular table and to measure their response time.

Referring now to FIG. 4, a receiver means, indicated generally at 30, is illustrated which is adapted for use with the central station 20 of FIG. 2 or FIG. 1. The receiver means 30 includes an antenna 31 which is provided to receive all of the signals generated by the various transmitter means, such as the transmitter means 10-1A, described above. The antenna 31 is connected to a plurality of receivers, such as are indicated at 32-1, 32-2, etc. Each of the receivers 32-1, 32-2, etc., is designed to receive only the unique signal corresponding to a particular individual table and transmitter means. For example, the receiver 32-1 can be designed to receive only the unique signal generated by the transmitter means 10-1A located at the table 10-1. All other signals received by the antenna 31 are ignored by the receiver 32-1. When the unique signal generated from the table 10-1 is received, the receiver 32-1 generates a signal to activate the visual indicator 20-1A of the corresponding individual section 20-1 of the central station 20 so as to alert the service personnel, as described above. The visual indicator 20-1A provides a first indication to the service personnel that a customer has requested service. At the same time, the receiver 32-1 also generates a signal to the digital counter 20-1C, resetting the counter 20-1C to zero. The timer 20-1C then automatically counts upwardly from zero at a rate of one count per second so long as it remains activated by the receiver 32-1. The structure of the digital timer 20-1C is conventional in the art.

At any given moment, the number contained in and displayed by the digital timer 20-1C represents the amount of time (in seconds) which has elapsed since the customer's request for service was first made. The timer 20-1C is connected to the audible annunciator 20-1B such that the annunciator 20-1B is activated when a predetermined count is reached by the timer 20-1C. This predetermined count represents an amount of time which is considered by the restaurant 10 to be unduly long in responding to the customer's request. The audible annunciator 20-1B provides a second indication that a customer has requested service. Alternatively, the visual indicator 20-1A and the audible annunciator 20-1B may be simultaneously activated by the receiver 32-1 to generate the first indication. In either event, the combined activation of the visual indicator 20-1A and the audible annunciator 20-1B will quickly alert the service personnel that immediate attention is required at the particular table. The second receiver 32-2, as well as the other receivers not illustrated, are all identical in structure and operation to the first receiver 32-1.

When one of the service personnel of the restaurant 10 does respond to the customer's request, he or she operates the table switch 15 so as to de-activate the transmitter 16. Such de-activation of the transmitter 16 interrupts the generation of the unique signal therefrom and, consequently, causes the corresponding receiver 32-1 to de-activate the visual indicator 20-1A, the audible annunciator 20-1B, and the digital timer 20-1C. The number contained in and displayed by the digital timer 20-1C at that time, representing the total response time, is stored therein until the next time a customer at the table 10-1 activates the transmitter 10-1A as described above, indicating another request. The above-described operations are repeated for each such request at each of the tables 10-1, 10-2, 10-3, and 10-4 in the restaurant 10.

A microprocessor 33 or other control means is connected to the visual indicator 20-1A, the audible annunciator 20-1B, and the digital timer 20-1C so as to receive information therefrom. The microprocessor 33 is conventional in the art and is adapted to sequentially interrogate the visual indicator 20-1A, the audible annunciator 20-1B, and the digital timer 20-1C in order to determine the status of the customer's requests at predetermined intervals. For example, the microprocessor 33 can first determine whether the visual indicator 20-1A has been activated by the receiver 32-1, indicating that a request has been made by a customer at the table 10-1. Next, the microprocessor 33 can determine whether the audible annunciator 20-1B has been activated by the digital timer 20-1C, indicating that an unduly long period of time has elapsed without a response to the customer's request. Lastly, the microprocessor 33 can determine the value of the number contained in the digital timer 20-1C so as to ascertain the current length of response time. The microprocessor 33 can be provided with a conventional memory device 34 for storing the data which it has received from the individual section 20-1. The information gathering process can be repeated as necessary with the individual section 20-1, as well as the other individual sections 20-2, 20-3, and 20-4, to continuously collect and update information from each of the tables 10-1, 10-2, 10-3, and 10-4 as to the status of the response time of the service personnel. One or more input/output devices 35 can be connected to the microprocessor 33 to permit an operator to communicate therewith in a conventional fashion.

The microprocessor 33 can be programmed to generate a history of the performance of the service personnel of the restaurant 10 in responding to the requests of the customers therein. For example, the average waiting time between a customer's request and a response by the service personnel can be calculated for each table or group of tables. Since each table is normally attended to by a single service person, a summary of the performance of that person can be generated over a period of time. Also, the number of times each of the audible annunciators was activated can be determined to reveal unsatisfactory performance. Many other types of information can be obtained with the data generated by the system. The computer program required to operate the microprocessor 33 in order to obtain such information is well within the scope of a person having ordinary skill in that field of art and, therefore, forms no part of the present invention.

In accordance with the provisions of the patent statutes, the principle and mode of operation of the present invention have been explained and illustrated in its preferred embodiment. However, it must be understood that the present invention can be practiced otherwise than as specifically explained and illustrated without departing from its spirit or scope.

What is claimed is:

1. A system for summoning service personnel and monitoring their response time in a facility having a plurality of tables at which customers are located comprising:

an electromagnetic signal transmitter located at each table, each of said transmitters including switch means operable by a customer requesting service to selectively activate that transmitter so as to generate a signal which is unique to that particular table;

a central station located within the facility having a plurality of individual sections therein, each of said individual sections corresponding to a particular table in the facility and including a visual indicator and an audible annunciator and a timer;

receiver means disposed within said central station and responsive to the generation of said unique signals from each of said tables for activating the visual indicator of the individual section corresponding to a particular table whose transmitter has been activated by a customer requesting service and for resetting the timer of said corresponding individual section to zero and subsequently activating said timer to count upwardly at a predetermined rate, said receiver means being adapted to deactivate said visual indicator and said audible annunciator and said timer when the receiver ceases receiving the signal unique to that particular individual section of the central station, and a microprocessor connected to the visual indicators, the audible annunciators and the timers of the central station to store and compile the data generated by the central station.

2. A system for summoning service personnel and monitoring their response time in a facility having a plurality of tables at which customers are located as set forth in claim 1 wherein all the timers are digital timers adapted to count upwardly at a rate of one count per second.

3. A system for summoning service personnel and monitoring their response time in a facility having a plurality of tables at which customers are located as set forth in claim 1 wherein the audible annunciator of each individual section is activated simultaneously with activation of the corresponding visual indicator.

4. A system for summoning service personnel and monitoring their response time in a facility having a plurality of tables at which customers are located as set forth in claim 1 wherein the audible annunciator of each individual section is activated by the timer of that individual section recording a predetermined amount of time beyond the timer's activation.

* * * * *